Figure 1:
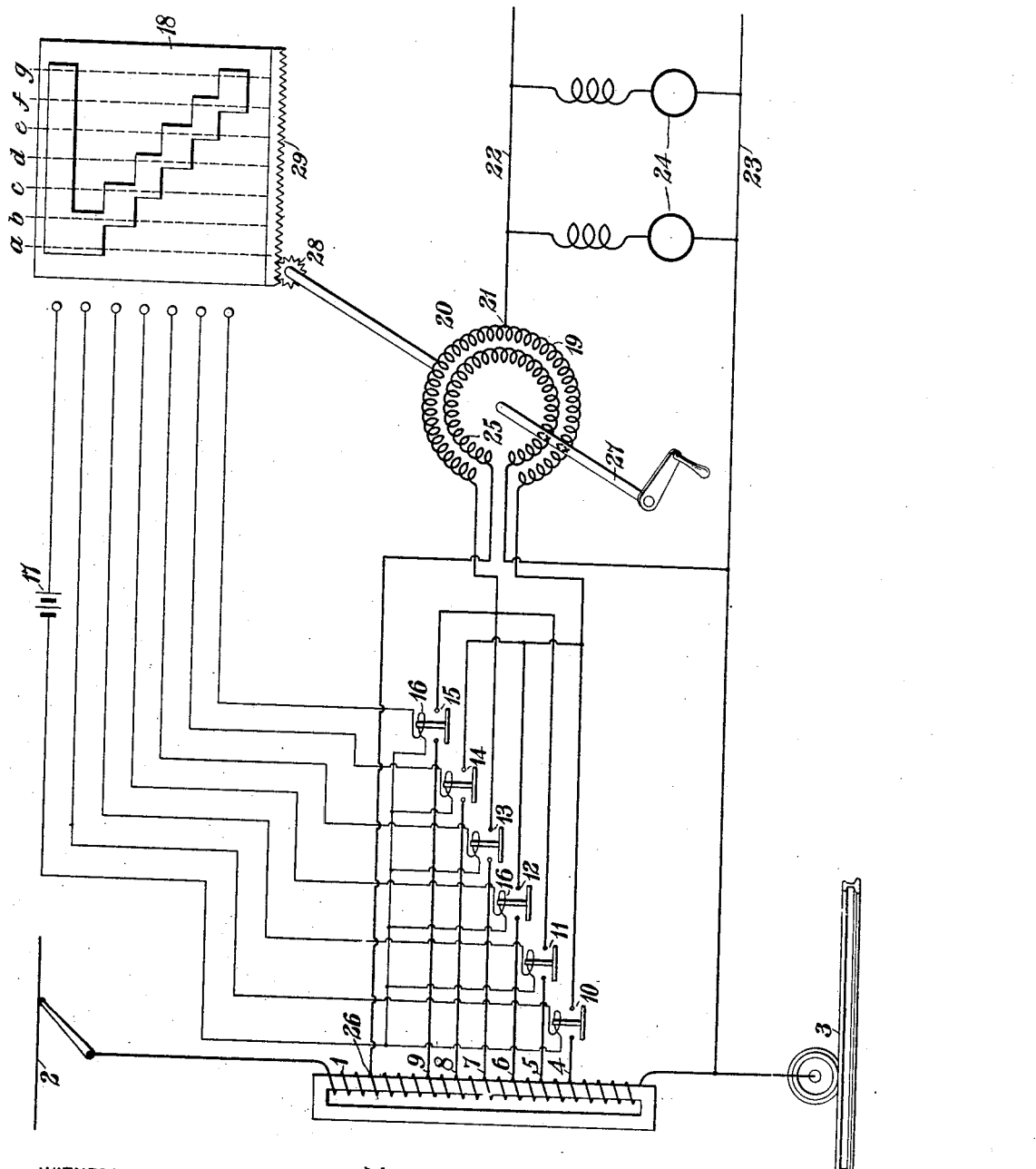

No. 824,225. PATENTED JUNE 26, 1906.
R. WIKANDER.
VOLTAGE REGULATOR.
APPLICATION FILED JUNE 19, 1905.
4 SHEETS—SHEET 2.
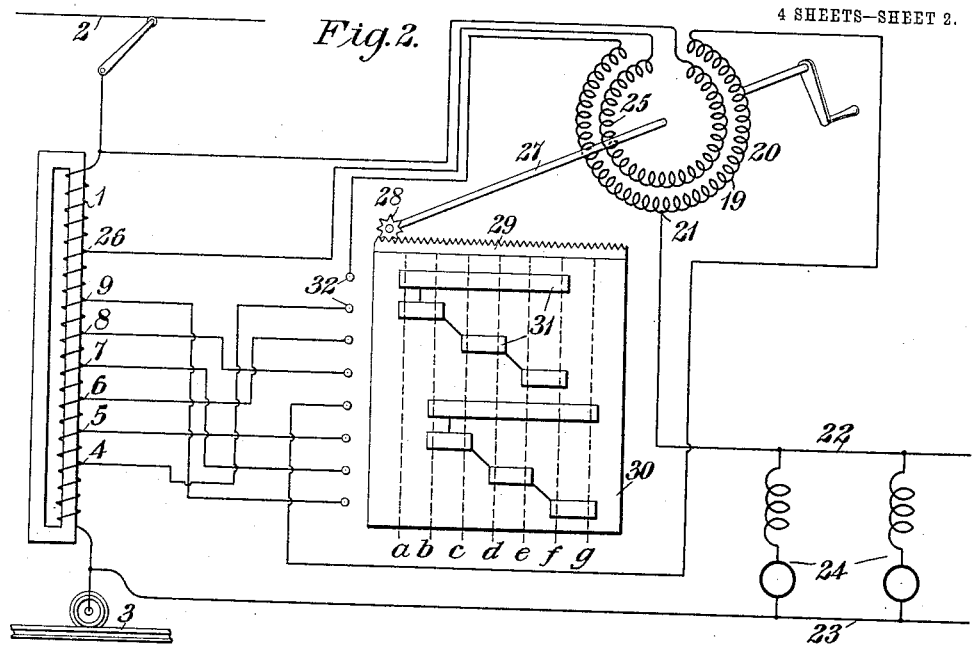
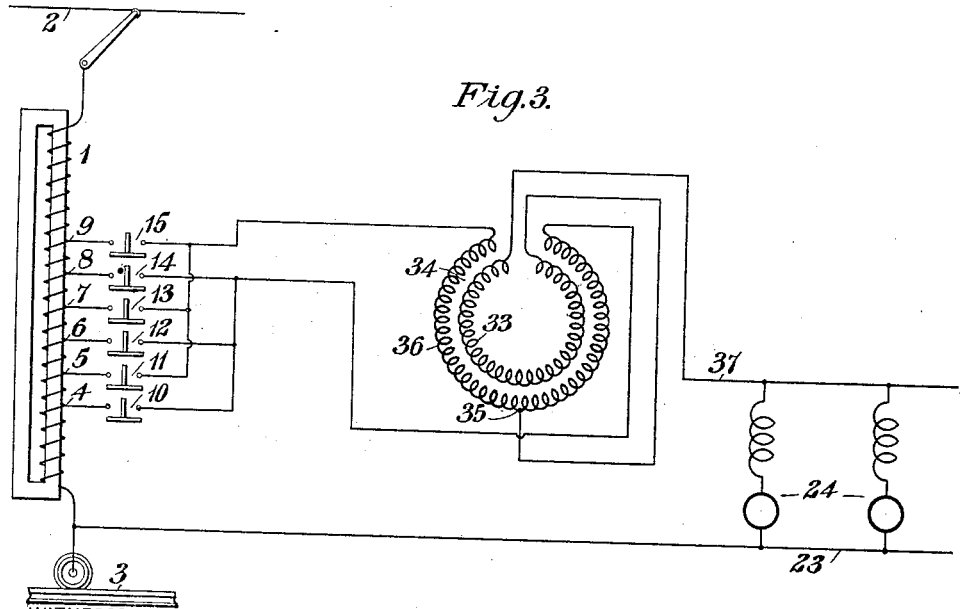
WITNESSES:
C. L. Belcher
R. J. Dearborn
INVENTOR
Ragnar Wikander
BY
Wesley G. Carr
ATTORNEY

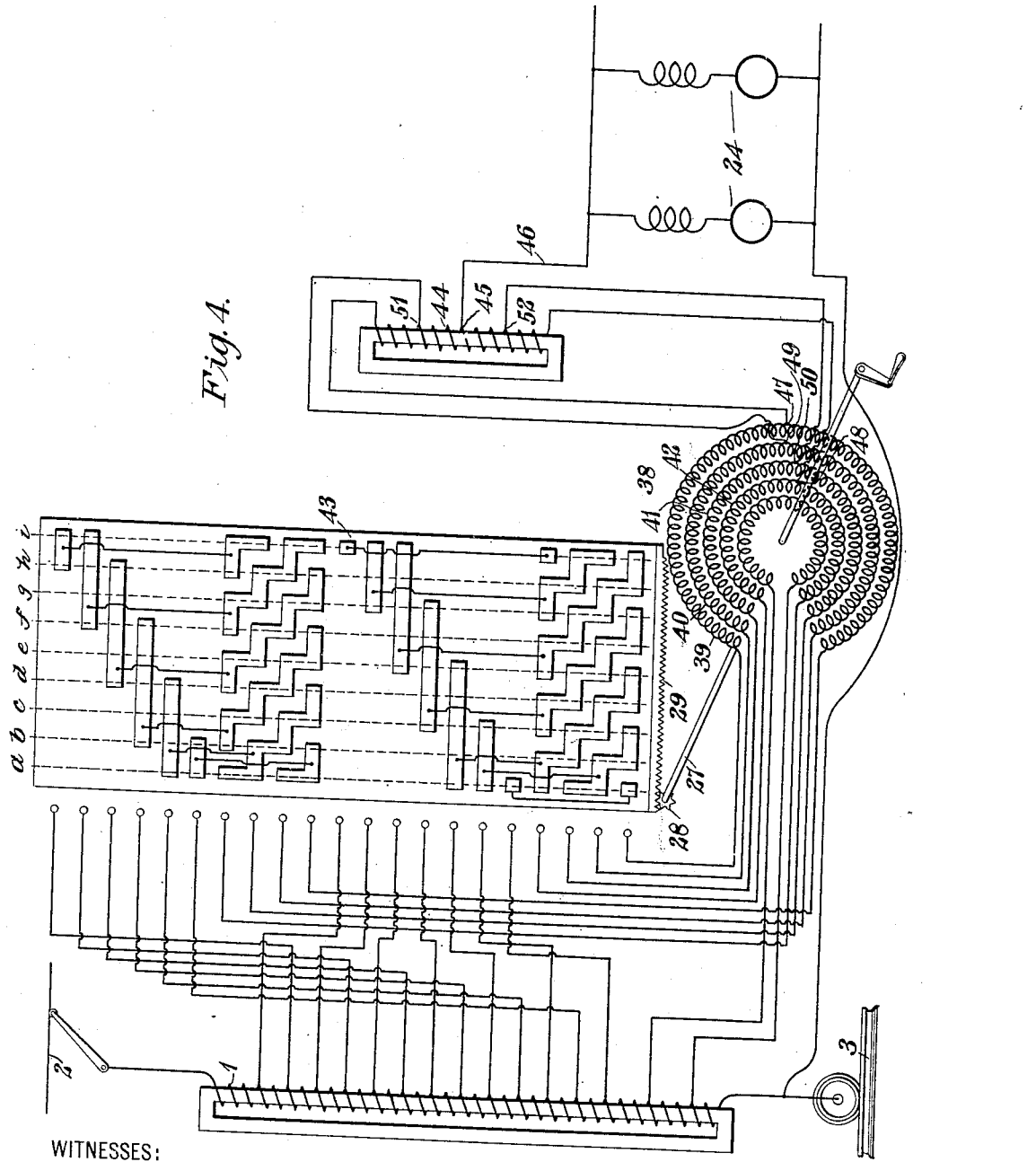

No. 824,225. PATENTED JUNE 26, 1906.
R. WIKANDER.
VOLTAGE REGULATOR.
APPLICATION FILED JUNE 19, 1905.

4 SHEETS—SHEET 4.

WITNESSES:
C. L. Belcher
R. J. Dearborn

INVENTOR
Ragnar Wikander
BY
Wesley S. Carr
ATTORNEY

UNITED STATES PATENT OFFICE.

RAGNAR WIKANDER, OF EDGEWOOD PARK, PENNSYLVANIA, ASSIGNOR TO WESTINGHOUSE ELECTRIC & MANUFACTURING COMPANY, A CORPORATION OF PENNSYLVANIA.

VOLTAGE-REGULATOR.

No. 824,225.  Specification of Letters Patent.  Patented June 26, 1906.

Application filed June 19, 1905. Serial No. 265,983.

*To all whom it may concern:*

Be it known that I, RAGNAR WIKANDER, a subject of the King of Sweden and Norway, and a resident of Edgewood Park, in the county of Allegheny and State of Pennsylvania, have invented a new and useful Improvement in Voltage-Regulators, of which the following is a specification.

My invention relates to voltage-regulators, and particularly to such regulators as vary the voltage applied to a circuit by varying the active length of a transformer-winding.

The object of my invention is to provide an improved form of regulator of the type specified whereby the voltage may be varied smoothly and gradually between minimum and maximum limits.

In Patent No. 620,365, granted February 28, 1899, to the Westinghouse Electric & Manufacturing Company as assignee of Norman Rowe is shown and described a method of regulating the electromotive force of a circuit which is supplied by a transformer, the active length of a winding of which is variable, that consists in first inductively varying the electromotive force within limits corresponding to a division of the winding, then cutting such division either into or out of circuit, and repeating such operations until the desired change in electromotive force is secured.

The means employed for inductively varying the electromotive force within limits corresponding to a division of the transformer-winding, as shown in the patent, comprises an induction-regulator the secondary winding of which is adapted to be connected between alternate leads from the transformer-winding, the remaining transformer-leads being adapted to be connected directly to the distributing-circuit. When practicing the method by this means, the voltage of the circuit is gradually increased or decreased during alternate periods, the voltage of the circuit remaining unaffected during the intervening periods. The induction-regulator serves to so raise or lower the voltage of the circuit that when circuit connection with the transformer-winding is changed substantially no difference of potential exists between the circuit-terminal and the point in the transformer-winding with which connection is made or broken.

My invention is an improvement over the means set forth in the aforesaid patent; and it consists in successively connecting the respective terminals of the secondary winding of the induction-regulator to consecutive leads from the transformer-winding, a terminal of the distributing-circuit being connected to approximately the middle point of the secondary winding of the regulator. I thereby obtain a smooth and steady variation of voltage between the minimum and maximum limits without the occurrence of periods during which no variations in the voltage take place while the regulator is in operation.

My invention differs further from that set forth in the aforesaid patent in that changes in the connections of the regulator-winding with the transformer occur only when the voltage of the distributing-circuit is less than or exceeds the voltage that may be derived from the next successive lead by half the difference of potential between consecutive leads.

When very large amounts of current are supplied to a distributing-circuit, it is generally desirable that the current be conducted by a plurality of switch devices in order that the dimensions of the contact members may not exceed practical limits and also in order to provide against interrupting the circuit by a single switch. For this reason I may further provide the regulator with a plurality of secondary windings arranged in parallel relation, which are adapted to be connected, respectively, between adjacent sets of successive transformer-leads and the middle points of which are connected, respectively, to points in an inductive winding, which in turn has its middle point connected to a conductor of a distributing-circuit and which equalizes the voltage delivered to the circuit by the secondary winding.

Figure 1 of the accompanying drawings is a diagrammatic view of a system of distribution embodying my invention. Figs. 2 and 3 are diagrammatic views of systems embodying modifications of my invention. Fig. 4 illustrates diagrammatically a system as arranged in accordance with my invention for regulating the voltage when large amounts of current are supplied to the distributing-circuit. Figs. 5, 6, 7, 8, and 9 are diagrams illustrating specific circuit conditions which may be obtained in the use of the system shown in Fig. 4.

A transformer-winding 1, which may be supplied with energy from a trolley-conductor 2 and a track-rail 3 or from any other suitable source, is subdivided by means of leads 4, 5, 6, 7, 8, and 9 in the circuits in which switches 10, 11, 12, 13, 14, and 15 are respectively located. The switches may be provided with operating magnet-windings 16, the circuits of which may be supplied with energy from a battery 17 or from any other suitable source and which are controlled by means of a master-switch 18. If desired, the switches may be operated by any other suitable means, such as by fluid-pressure, and their operation may be controlled in any other suitable manner.

The corresponding stationary contact-terminals of switches 10, 12, and 14 at one side are connected together and to one terminal of the secondary winding 19 of a voltage-regulator 20, and the similar corresponding contact-terminals of switches 11, 13, and 15 are connected together and to the other terminal of the secondary winding 19, the middle or any other suitable intermediate point 21 of which is connected to a distributing-conductor 22, between which and a second distributing-conductor 23 motors 24 or any other suitable translating devices may be connected.

Primary winding 25 of the voltage-regulator 20 may be connected between distributing-conductor 23 and any suitable point in the transformer-winding, such as the point 26, or it may be supplied with energy from any other suitable source. The inductive relations of the regulator-windings 19 and 25 are adjustable, and any suitable means, such as a manually-controlled shaft 27, may be employed for adjusting these relations, the shaft 27 being provided with means for effecting simultaneous operation of a master-switch 18, such as a pinion 28, that meshes with a rack 29, which is attached to the drum of the device 18. Obviously any other suitable means may be employed for operating the induction-regulator and the controlling-switch 18 simultaneously, that which I have here shown being only illustrative of any suitable device.

In order to explain the operation of my invention, it may be supposed that the controlling-shaft 27 is rotated so as to bring controller 18 into position a, thereby effecting closure of switch 10, and so as to bring primary winding 25 of the voltage-regulator 20 into such an inductive relation to the secondary winding 19 that the difference of potential existing between the distributing-conductors 22 and 23 will be less than that existing between the lead 4 and distributing-conductor 23 by an amount equal to the maximum raising or lowering effect of the regulator or half of that existing between successive leads 4 and 5 from the transformer-winding 1. As the controlling-shaft 27 is rotated the inductive relations of the windings 25 and 19 may be so varied that the voltage applied to the distributing-circuit will gradually become equal to the difference of potential existing between lead 4 and distributing-conductor 23, and if it is further rotated the voltage derived from the transformer-winding will be gradually supplemented by a voltage derived from the inductive regulator 20. When the controller 18 approaches position b, switch 11 closes and current will be supplied to the distributing-circuit through leads 4 and 5 and both halves of secondary winding 19 of the induction-regulator, and under these conditions the voltage of the distributing-circuit will be equal to that existing between the distributing-conductor 23 and a point in the transformer-winding 1 intermediate the leads 4 and 5. As the controller 18 approaches position c the circuit of the operating magnet-winding of the switch 10 is interrupted, thereby allowing the switch to open and the voltage applied to the distributing-circuit will be less than the difference of potential existing between lead 5 and distributing-conductor 23, but will gradually approach that value and then exceed it, as before described. Inasmuch as the operation of the system continues in the same manner as that described for the first few steps it is deemed unnecessary to set forth its operation more in detail.

It is to be observed that the terminals of the secondary winding of the regulator are connected, respectively, to consecutive leads from the transformer-winding and changes in connections of the secondary winding to the transformer-winding occur only when the voltage of the distributing-circuit is less than or exceeds the voltage that may be derived from the next successive transformer-lead by half the difference of potential existing between consecutive leads. I am thereby enabled to obtain a smooth variation in the voltage applied to the distributing-circuit, between the desired limits, without the occurrence of periods during which no effect upon the voltage of the circuit occurs while the voltage-regulator is in operation.

In many cases it may be desirable to dispense with the use of independently-operated switches, such as are shown in Fig. 1, and to employ instead a controller which may be operated directly by the same means as effect operation of the inductive regulator, and in Fig. 2 I have shown such a modification of my invention. The controlling-shaft 27 is provided with a pinion 28, which meshes with a rack 29, that is attached to a controller-drum 30. The drum is provided with suitable conducting-strips 31, which are adapted to engage contact-fingers 32, and thereby control the circuit connections.

In Fig. 3 I have shown a secondary winding 32 of an induction-regulator 34, one terminal of which is connected to approximately the middle point 35 of the primary winding 36 and the other terminal of which is connected to the distributing-conductor 37, it being possible to employ such a combination if desired. Many other arrangements and modifications may be employed without departing from the spirit of the invention.

When the amounts of current to be conducted by the switch devices are very large, it may be found desirable to provide a system such as I have illustrated in Fig. 4, in which an induction-regulator 38 is provided with a plurality of secondary windings 39, 40, 41, and 42, that are arranged in parallel relation and may be connected, respectively, between adjacent sets of successive transformer-leads by means of a suitably-constructed controller 43, which is operated in a manner similar to that before described. With such an arrangement the middle points of the secondary windings or other suitable points intermediate their terminals should be so connected to an inductive winding 44 that the ampere-turns in the winding on either side of a point 45 therein, to which the distributing-conductor 46 is connected, shall be approximately equal, this winding serving to equalize the voltages that are supplied to the circuit by the respective secondary windings. As here shown, the middle points 47 and 48 of secondary windings 39 and 42 are connected, respectively, to the terminals of the winding 44, and the middle points 49 and 50 of secondary windings 40 and 41 are connected to points 51 and 52, respectively, in the winding 44, located approximately equidistant from the point 45 in the winding 44.

Figure 5:
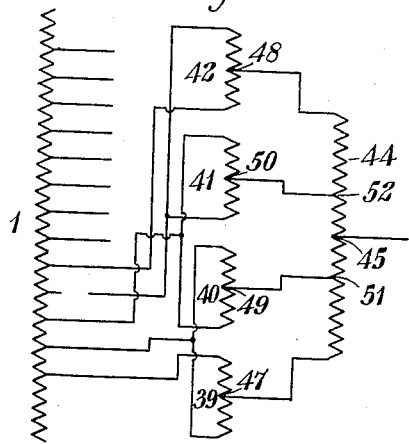
Figure 6:
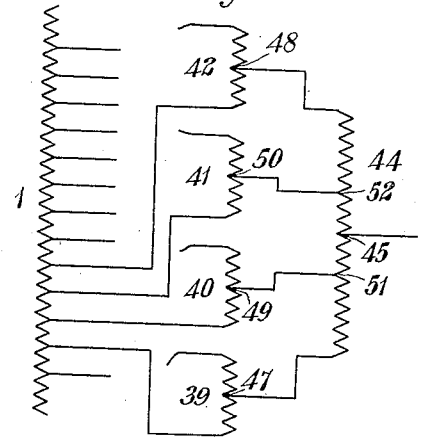
Figure 7:
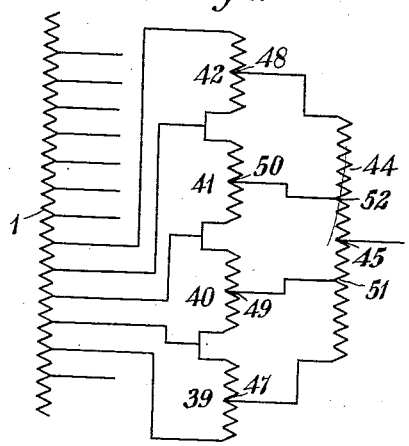
Figure 8:
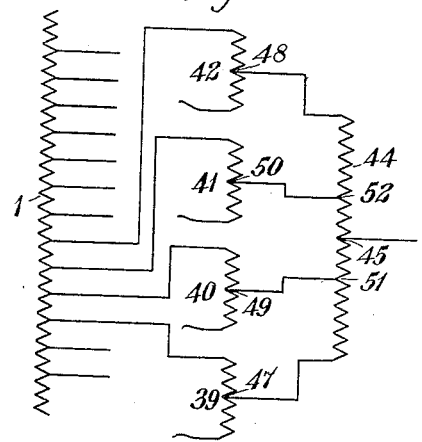
Figure 9:
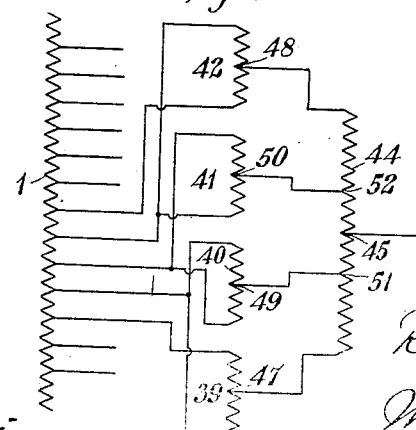

Since it is difficult to describe the circuit conditions when the regulator occupies its various positions, I have prepared diagrams of such circuit conditions, the diagram of Fig. 5 illustrating the circuit conditions when the controller 43 occupies position a, Fig. 6 representing the conditions when the controller occupies a position approximately midway between positions a and b, Fig. 7 representing the conditions when the controller occupies position b, Fig. 8 representing the conditions when the controller occupies a position approximately midway between positions b and c, and Fig. 9 representing the conditions when the controller occupies position c. Since the remaining steps in the operation of the regulator are in all respects similar to those here shown, it is deemed unnecessary to further describe or show these steps.

The object of the arrangement shown in Fig. 4 is to provide a plurality of paths for the current through the switch devices, and thereby permit of the employment of contact-terminals of more practical dimensions than could otherwise be employed and prevent interruption of the circuit by means of a single pair of contact-terminals. Such an arrangement permits the controlling of circuits which conduct very large amounts of current by means of comparatively simple and inexpensive apparatus and without injury thereto by reason of burning and arcing of the contact-terminals.

I claim as my invention—

1. The combination with a distributing-circuit and a transformer-winding having leads extending from several points therein, of a voltage-regulator having windings the inductive relations of which are variable, and means for successively connecting the respective terminals of one of the regulator-windings to consecutive leads from the transformer-winding.

2. The combination with a distributing-circuit and a transformer-winding having leads extending from several points therein, of a voltage-regulator having windings the inductive relations of which are variable, and means for successively connecting the respective terminals of one of the regulator-windings to consecutive leads from the transformer-winding, a point intermediate the terminals of the regulator-winding being connected to the distributing-circuit.

3. The combination with a distributing-circuit and a transformer-winding having leads extending from several points therein, of a voltage-regulator having windings the inductive relations of which are variable, and means for successively connecting the respective terminals of one of the regulator-windings to consecutive leads from the transformer-winding, changes in the connections of the regulator-winding with the transformer occurring only when the voltage of the distributing-circuit is less than or exceeds the voltage that may be derived from the next successive lead by half the difference of potential between consecutive leads.

4. The combination with a distributing-circuit and a transformer-winding having leads from several points therein, of a voltage-regulator having primary and secondary windings the inductive relations of which are variable and means for successively connecting the respective terminals of the secondary winding of the regulator to consecutive leads from the transformer-winding.

5. The combination with a distributing-circuit and a transformer-winding having leads from several points therein, of a voltage-regulator having primary and secondary windings the inductive relations of which are variable and means for successively connecting the respective terminals of the secondary winding of the regulator to consecutive leads from the transformer-winding, a point intermediate the terminals of the secondary winding being connected to the distributing-circuit.

6. The combination with a distributing-circuit and a transformer-winding having leads from several points therein, of a voltage-regulator having primary and secondary windings the inductive relations of which are variable and means for successively connecting the respective terminals of the secondary winding of the regulator to consecutive leads from the transformer-winding, a point intermediate the terminals of the secondary winding being connected to the distributing-circuit and changes in the connections of the regulator-winding to the transformer-leads occurring only when the voltage of the distributing-circuit is less than or exceeds the voltage that may be derived from the next successive lead by half the difference of potential between consecutive leads.

7. The combination with a distributing-circuit and a plurality of leads extending from a source of multivoltage, a voltage-regulator having windings the inductive relations of which are variable, and means for successively connecting the respective terminals of one of the regulator-windings to consecutive leads.

8. The combination with a distributing-circuit and a plurality of leads extending from a source of multivoltage, a voltage-regulator having windings the inductive relations of which are variable, and means for successively connecting the respective terminals of one of the regulator-windings to consecutive leads, a point intermediate the terminals of the regulator-winding being connected to the distributing-circuit.

9. The combination with a distributing-circuit and a plurality of leads extending from a source of multivoltage, a voltage-regulator having windings the inductive relations of which are variable, and means for successively connecting the respective terminals of one of the regulator-windings to consecutive leads, changes in the connection of the regulator-winding with the leads occurring only when the voltage of the distributing-circuit is less than or exceeds the voltage that may be derived from the next successive lead by half the difference of potential between consecutive leads.

10. The combination with a distributing-circuit and a transformer-winding having leads extending from several points therein, of a voltage-regulator having a primary winding and a plurality of secondary windings arranged in parallel relation, means for connecting the secondary windings respectively between successive terminals, an inductive winding, connections between the same and points intermediate the terminals of the secondary windings, and circuit connections to the inductive winding at such points that the ampere-turns in the winding on both sides thereof shall be equal.

11. The combination with a distributing-circuit and a transformer-winding having leads extending from several points therein, of a voltage-regulator having a primary winding, a plurality of secondary windings arranged in parallel relation, means for connecting the secondary windings respectively between adjacent sets of successive transformer-leads, an inductive winding, connections between the same and approximately the middle points of the secondary windings, and circuit connections to the inductive winding at approximately its middle point.

12. The combination with a distributing-circuit and a plurality of leads from a source of multivoltage, of a voltage-regulator having a primary winding and a plurality of secondary windings arranged in parallel relation, means for connecting the secondary windings respectively between adjacent sets of successive leads, an inductive winding, connections between the same and points intermediate the terminals of the secondary windings, and a circuit connection to the inductive winding at a point intermediate its terminals.

In testimony whereof I have hereunto subscribed my name this 17th day of June, 1905.

RAGNAR WIKANDER.

Witnesses:
J. H. MUSTARD,
BIRNEY HINES.